United States Patent [19]
Orth et al.

[11] Patent Number: 5,667,556
[45] Date of Patent: Sep. 16, 1997

[54] METHOD OF REPROCESSING ZINC- AND IRON OXIDE-CONTAINING RESIDUAL MATERIAL

[75] Inventors: Andreas Orth, Friedrichsdorf; Peter Weber, Hammersbach; Uwe Härter, Dinslaken; Ernst Wallis, Eschborn, all of Germany

[73] Assignee: Metallgesellschaft Aktiengesellschaft, Frankfurt am Main, Germany

[21] Appl. No.: 643,463

[22] Filed: May 3, 1996

[30] Foreign Application Priority Data

May 5, 1995 [DE] Germany ............... 195 16 558.6

[51] Int. Cl.$^6$ ................................................. C22B 7/00
[52] U.S. Cl. .................... 75/450; 75/665; 75/961; 423/107; 423/148
[58] Field of Search .................... 75/665, 450, 961; 423/107, 148

[56] References Cited

U.S. PATENT DOCUMENTS 5,474,592  12/1995  Bresser et al. ..................... 75/961

*Primary Examiner*—Melvyn Andrews
*Attorney, Agent, or Firm*—Herbert Dubno

[57] ABSTRACT

This invention describes a method of reprocessing zinc- and iron oxide-containing residual material. Zinc- and iron oxide-containing dust and/or sludge is granulated with water, granules and carbonaceous material are fed to a circulating fluidized bed system, the gas-solids suspension circulated in the circulating fluidized bed system is fed to a second fluidized bed reactor, the solids discharged from the second fluidized bed reactor are recycled to the reactor of the circulating fluidized bed system, 50 to 75% by volume of the oxygen required to gasify the carbonaceous material are fed as fluidizing gas to the reactor of the circulating fluidized bed system and 25 to 50% by volume of said required oxygen are fed as a fluidizing gas and secondary gas to the second fluidized bed reactor, iron oxide-containing material is discharged from the reactor of the circulating fluidized bed system and zinc-containing material is discharged with the exhaust gas from the circulating fluidized bed system.

13 Claims, 1 Drawing Sheet

METHOD OF REPROCESSING ZINC- AND IRON OXIDE-CONTAINING RESIDUAL MATERIAL

FIELD OF THE INVENTION

This invention relates to a method of reprocessing zinc- and iron oxide-containing residual material.

BACKGROUND OF THE INVENTION

Published German Application 43 17 578 discloses a method of reprocessing zinc- and lead-containing residual materials from metallurgical plants. In that method, zinc- and lead-containing residual materials from metallurgical plants are reprocessed by a thermal treatment in a circulating fluidized bed system. The required heat is supplied in that solid carbon is combusted in the fluidized bed reactor of the circulating fluidized bed system. A solid carbon content from 5 to 30% is adjusted in the lower portion of the fluidized bed. Oxygen-containing gases are supplied to the upper portion of the fluidized bed reactor, and the formation of $CO_2$ is so restricted that zinc metal is not oxidized. The suspension which has been discharged is treated in a recycle cyclone to remove substantially all solids, which are then recycled. The gas is cooled to a temperature at which zinc metal is oxidized to ZnO. The dustlike compounds of zinc and lead are separated from the gas.

In the known method, up to 85% by weight of the zinc contained in the iron oxide-containing residual material are volatilized. For this reason 0.15% by weight zinc is still contained in the reprocessed iron oxide-containing residual material. In the succeeding blast furnace process that zinc content is disturbing because it gives rise to a circulation of zinc, caking, and higher costs.

OBJECTS OF THE INVENTION

It is an object of the present invention to provide for the reprocessing of zinc- and iron oxide-containing residual materials a method which is both economical and ecologically satisfactory.

SUMMARY OF THE INVENTION

The object of the present invention is accomplished in that a) zinc- and iron oxide-containing dust and/or sludge is granulated with water, b) granules formed in step (a) and carbonaceous material are fed to a circulating fluidized bed system, c) the gas-solids suspension circulated in the circulating fluidized bed system is fed to a second fluidized bed reactor, d) the solids discharged from the second fluidized bed reactor are recycled to the reactor of the circulating fluidized bed system, e) 50 to 75% by volume of the oxygen required to gasify the carbonaceous material are fed as fluidizing gas to the reactor of the circulating fluidized bed system and 25 to 50% by volume of said required oxygen are fed as a fluidizing gas and secondary gas to the second fluidized bed reactor, f) iron oxide-containing material is discharged from the reactor of the circulating fluidized bed system and zinc-containing material is discharged with the exhaust gas from the circulating fluidized bed system.

The advantage afforded by the present invention over the known method resides in that less that 10% by weight zinc is contained in the iron oxide-containing material which is discharged from the reactor of the circulating fluidized bed system. Another advantage afforded by the present invention resides in that larger amounts of zinc are volatilized so that larger amounts of zinc can be recovered and economically utilized.

Sludge formed by the dedusting of blast furnace top gases, dust from dedusting plants of steel works and from sintering plants, and sludge formed by the further processing of crude steel may be used as a starting material for the purposes of the invention. The reprocessing in accordance with the invention provides two fractions, namely, a high-oxide fraction, in which the contents of compounds of zinc, lead, and alkali metal are so low that the material may be fed to a blast furnace process, and a second fraction, which after the separation of carbon contains more than 30% by weight zinc and lead so that said fraction may be used to recover said metals from secondary raw materials. 50 to 75% by volume of the oxygen required for combusting are supplied to the bottom of the reactor of the circulating fluidized bed system. The remaining oxygen is supplied as a fluidizing gas and secondary gas to the second fluidized bed reactor. The required oxygen may be supplied as oxygen-enriched air or technical oxygen. Both gas streams are preheated to temperatures >650° C. in preheating stages outside the reactors.

A sufficient residence time of the material in the circulating fluidized bed system is ensured by a proper selection of the parameters consisting of the material feed rate and the pressure difference over the height of the reactor. The pressure difference in the reactor is proportional to the content of material in the reactor and is controlled by a continuous withdrawal of material from the bottom of the reactor. The discharging means consist of a water-cooled screw conveyor, which is speed-controlled. A seal from the atmosphere is provided by the column of material in the inlet of the screw conveyor and by a plug which is formed in the outlet of the screw conveyor; that outlet is provided with a flap valve. The weight which determines the contact pressure of the flap can be changed from the outside by loading with different weights.

The circulating fluidized bed system consists of a reactor, a first cyclone, from which the separated material is recycled through the second fluidized bed reactor to the lower one-third of the reactor of the circulating fluidized bed system. The circulating fluidized bed system comprises a second cyclone, from which the separated material may be recycled directly to the reactor of the circulating fluidized bed system and/or may be recycled through the second fluidized bed reactor to the reactor of the circulating fluidized bed system. In that case a pressure seal between the second cyclone and the reactor of the circulating fluidized bed system is provided by the column of material in the inlet and the plug-forming screw. Pendulum flaps may be used for the same purpose. A partial stream may be removed directly from the second cyclone. The removal of a partial stream may be used to control the rate at which material is recycled to the reactor of the circulating fluidized bed system.

According to a desirable feature of the invention the water content of the iron oxide-containing dust and/or sludge is adjusted to <13% by weight before the granulating step (a). Good results regarding the particle size distribution of the granules are obtained with that water content.

According to a desirable feature of the invention granules having a particle size from 0.1 to 3.0 mm are formed in step (a). The use of granules having particle sizes in that range permits particularly good results to be achieved by the treatment in the reactor of the circulating fluidized bed system.

According to a desirable feature of the invention the granules are dried to have a water content <10% by weight before they are fed to the reactor of the circulating fluidized bed system. That measure will result in a saving of energy. Good results will be achieved if granules having such a low water content are fed to the reactor of the circulating fluidized bed system.

According to a desirable feature of the present invention the feed rate of the carbonaceous material is 20 to 30% by weight of the total feed rate of material to the reactor of the circulating fluidized bed system. Optimum reaction conditions will be established if the carbonaceous material is fed at that rate.

According to a desirable feature of the invention the temperature in the reactor of the circulating fluidized bed system is adjusted to 950° to 1100° C., preferably to 1000° to 1050° C., in step (b). Zinc is volatilized with good results at said temperatures.

According to a desirable feature of the invention the ratio of CO to $CO_2$ in the reactor of the circulating fluidized bed system is adjusted to 1.1 to 1.5, preferably 1.2 to 1.4, in step (b). That ratio of CO to $CO_2$ gives good results regarding the volatilization of zinc and also regarding the reduction of iron$^{3+}$ to iron $2^+$. Besides, a reduction of irons$^{3+}$ and iron$^{2+}$ to iron metal is substantially prevented. A mixture of coal and coke is fed to the system and is partly combusted to establish a total atmosphere in which the ratio of CO to $CO_2$ is about 1.2 to 1.4.

According to a desirable feature of the invention the weight of the solids circulated per hour in the circulating fluidized bed system is at least 5 times the weight of the solids contained in the reactor.

According to a desirable feature of the invention 70 to 80% by weight of the carbonaceous material are fed to the second fluidized bed reactor in step (c). The feeding of the carbonaceous material at said rates permits a convenient control of the reduction potential in the reactor of the circulating fluidized bed system. The control of the reduction potential permits a volatilization of zinc with good results.

Within the scope of the invention it is contemplated that the material discharged in step (f) from the reactor of the circulating fluidized bed system is cooled to a temperature of <150° C. and water is added to the cooled material.

The discharged material is cooled to ambient temperature in a cooler, such as a sectional cooler, and before being forwarded to the sintering plant or a melting unit is moistened in a continuous mixer to have a water content >5% by weight.

It is also contemplated with the scope of the invention that the zinc-containing material which in step (f) is discharged together with the exhaust gas from the circulating fluidized bed system is cooled to a temperature from 200° to 250° C., material having a particle size >10 micrometers is separated and recycled to the granulating step (a), material having a particle size <10 micrometers is separated from the exhaust gas, water is added to the latter material, and the exhaust gas is afterburnt.

The substances consisting of compounds of zinc, lead and alkali metal which are to be removed consist of gases downstream of the second cyclone. The exhaust gas is cooled to temperatures <250° C. by an injection of water in a cooler so that the gaseous compounds of zinc, lead and alkali metal are condensed. In a succeeding cyclone, most particles >0.01 mm are removed from the cooled exhaust gas, which is dedusted to dust contents <10 mg/sm$^3$ (sm$^3$ = standard cubic meter) by means of cloth filters. The material separated in the cyclone is discharged through a stuffing screw system and is admixed to the residual materials in the feed stream and is subsequently granulated. Dusts which have been separated in a filter that succeeds the cyclone are discharged from the pressure chamber at an elevated temperature and before they are forwarded are agglomerated with an addition of water in an intermittently operated mixer. The dedusted process gas is afterburnt for the generation of power and/or steam.

According to a desirable feature of the invention a part of the dust removed by the filter from the exhaust gas is recycled to the feed stream for the filter. This will improve the separation of fine particles because they will effectively be agglomerated with and deposited on the material being discharged.

The present invention will be explained more in detail with reference to a drawing and to examples.

BRIEF DESCRIPTION OF THE DRAWING

The drawing, which is the sole figure in this application, is a schematic diagram of the present process.

DETAILED DESCRIPTION OF THE DRAWING

Figure 1:
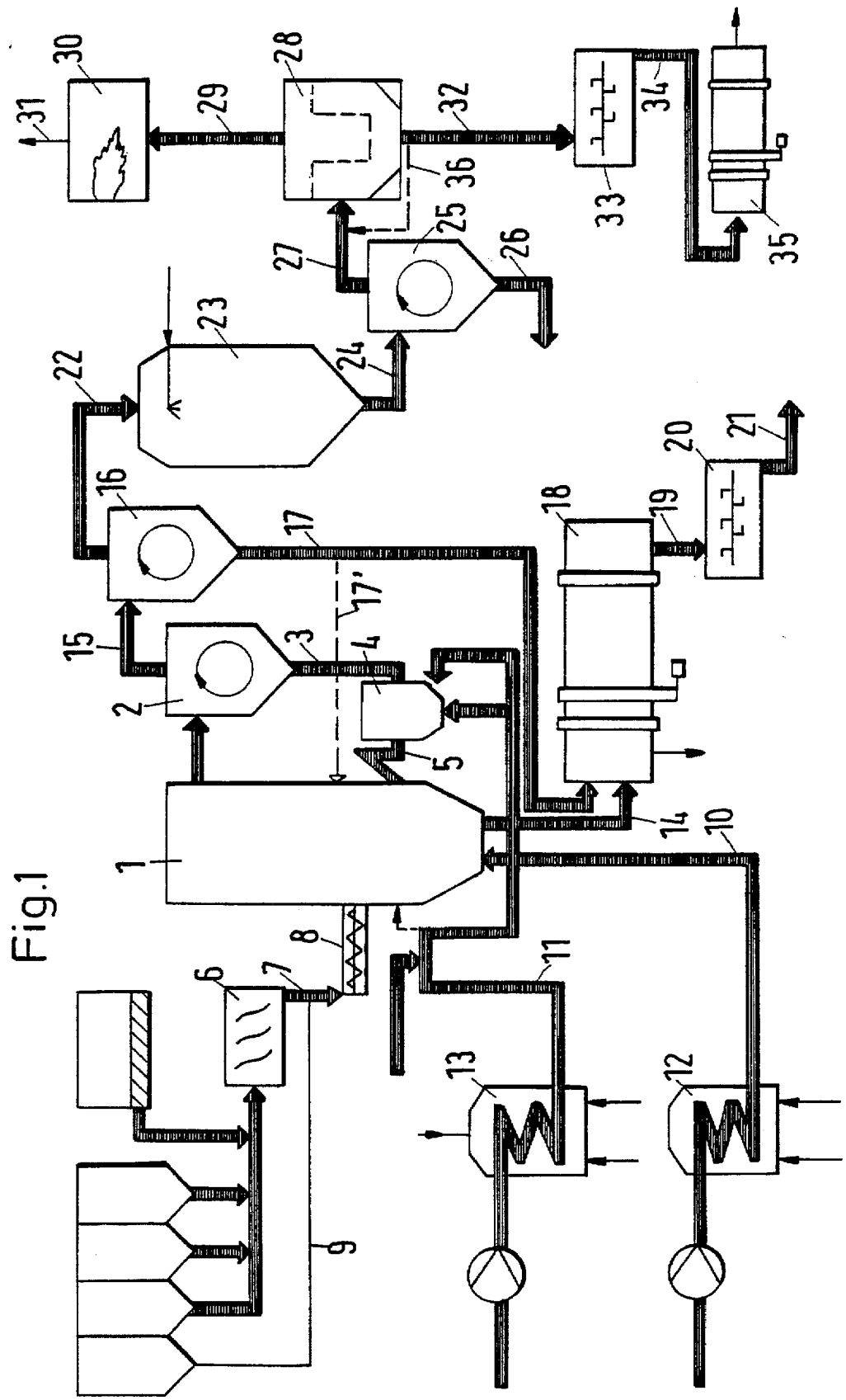

According to the drawing the circulating fluidized bed system consists of the fluidized bed reactor 1, the recycle cyclone 2, and the recycle line 3. The recycle line 3 leads to the fluidized bed reactor 4. A line 5 leading from the fluidized bed reactor 4 serves to supply secondary gas to the fluidized bed reactor 1. The zinc- and iron oxide-containing residual materials are micro-agglomerated in a unit 6 and are then supplied through line 7 to a screw conveyor 8. Coal is fed through lines 9 and 7 to the screw conveyor 8. The material is fed through the screw conveyor 8 to the fluidized bed reactor 1. The oxygen-containing gas is supplied through line 10 as fluidizing gas to the fluidized bed reactor 1. Oxygen-containing gas is supplied through line 11 as fluidizing gas and secondary gas to the fluidized bed reactor 4. Secondary gas can directly be supplied through line 11 to the fluidized bed reactor 1. The oxygen-containing gases conducted in lines 10 and 11 are preheated in the heat exchangers 12 and 13. Iron oxide-containing material is discharged through line 14 from the fluidized bed reactor 1. Zinc-containing material is fed from the recycle cyclone 2 together with the dust-laden exhaust gas through line 15 to the separating cyclone 16. The solids which have been separated in the separating cyclone 16 are discharged through line 17. Solids are fed through lines 17 and 14 to a water-cooled rotary tubular cooler 18. A branch line 17' may be used to feed part of the solids to the fluidized bed reactor 1. The cooled material is fed through line 19 to a mixer 20 and is moistened therein with water. The moistened material is discharged through line 21. The exhaust gas from the separating cyclone 16 is supplied through line 22 to an evaporative cooler 23. The cooled exhaust gas is supplied through line 24 to a separating cyclone 25. The solids which have been separated in the separating cyclone 25 are fed through line 26 to the granulator 6. The exhaust gas from the separating cyclone 25 is supplied through line 27 to a bag filter 28. The exhaust gas from the bag filter 28 is supplied through line 29 to an afterburning chamber 30 and is discharged from there through the line 31. The solids which have been separated in the bag filter 28 are fed through Sine 32 to a mixer 33 and are moistened there with water. The material is fed through line 34 preferably to a waelzing rotary kiln 35 for the production of oxide by waelzing. A partial stream 36 may be branched from the line 32 and be fed through line 27 to the bag filter 28.

Examples

Example 1

A mixture of blast furnace top gas mud, converter dust, and electrostatic precipitator dust from a sintering plant was granulated in a granulator to form microgranules having a particle size from 0.1 to 3 mm and a water content of 16.3% by weight. The fluidized bed reactor 1 of the circulating fluidized bed system had a height of 15 m and was 3.6 m in diameter and was fed with 23,5000 kg/h microgranules and 6.2000 kg/h coals, which consisted of 10% coke breeze and 90% gas flame coal, which contained 30% volatile constituents. The reactor 1 was supplied with 13,000 sm$^3$/h air at 600° C. as fluidizing gas 10. 12,000 sm$^3$/h air at 700° C. were fed as secondary gas to fluidized bed 4. The temperature in the fluidized bed reactor 1 amounted to 1020° C., 39,500 sm$^3$/h exhaust gas were withdrawn from the separating cyclone 16 and contained 11% CO, 9% $CO_2$, 10% $H_2$, 15% $H_2O$, and 54% $N_2$. 18,000 kg/h water were injected into the evaporative reactor 23. Gas at a temperature of 220° C. left the evaporative cooler 23. 62,000 sm$^3$/h exhaust gas left the filter 28. 2300 kg/h dust, which contained 22% by weight Zn+Pb, 20% by weight C, 34% by weight FeO, and 10% by weight $Fe_2O_3$, were separated in the evaporative cooler 23 and the filter 28. 23,200 kg/h solids, which contained 0.3% Zn and 9.1% C, were withdrawn from the fluidized bed reactor 1 and the separating cyclone 16.

Example 2

A mixture of blast furnace top gas mud, converter dust and electrostatic precipitator dust from a sintering plant was granulated in a granulator to form microgranules having a particle size from 0.1 to 3.0 mm and a water content of 16% by weight. The fluidized bed reactor 1 of the circulating fluidized bed system had a height of 15 m and was 3.6 m in diameter and was fed with 23,500 kg/h microgranules and 6,200 kg/h coals, which consisted of 10% coke breeze and 90% gas flame coal, which contained 30% volatile constituents. The fluidized bed reactor i was supplied with 13,000 sm$^3$/h air at 600° C. as fluidizing gas. 12,000 sm$^3$/h air at 700° C. were supplied to the second fluidized bed reactor 4. Temperature in reactor 1 and in fluidized bed reactor 4 amounted to 1020° C. 39,350 sm$^3$/h exhaust gas were withdrawn from the separating cyclone 16 and contained 13% CO, 10% $CO_2$, 12% H, 14% $H_2O$, and 50% $N_2$. 18,000 kg/h water were injected into the evaporative cooler 23. The gas leaving the evaporative cooler 23 was at a temperature of 230° C. 62,300 sm$^3$/h exhaust gas left the filter 28. 2600 kg/h dust, which contained 30% by weight Zn, 9% by weight lead, 20% by weight C, 6% by weight FeO, and 10% by weight $Fe_2O_3$, were separated in the evaporative cooler 23 and the filter 28. 22,700 kg/h solids, which contained 0.09% by weight Zn and 5.0% by weight C, were withdrawn from the fluidized bed reactor i and the separating cyclone 16.

What is claimed is:

1. A method of reprocessing zinc- and iron oxide-containing residual material, which comprises the steps of:
   (a) granulating a zinc- and iron oxide-containing dust or sludge with water to form granules of the residual material;
   (b) feeding the granules of the residual material formed according to step (a) and carbonaceous material to a first fluidized bed reactor of a circulating fluidized bed system comprising said first fluidized bed reactor, a cyclone and a second fluidized bed reactor connected to said cyclone and said first reactor, temperature in said first reactor being in the range of 950° to 1100° C., feeding a gas-solids suspension from said first fluidized bed reactor to said cyclone;
   (c) feeding solids from said cyclone to said second fluidized bed reactor containing a fluidized bed of solids;
   (d) discharging solids from the second fluidized bed reactor and recycling the solids to the first fluidized bed reactor of the circulating fluidized bed system;
   (e) feeding as a fluidizing gas to the first fluidized bed reactor 50 to 75% by volume of the oxygen required to gasify the carbonaceous material in said first fluidized bed reactor;
   (f) feeding as a fluidizing gas to the second fluidized bed reactor 25 to 50% by volume of the oxygen required to gasify the carbonaceous material in said second fluidized bed reactor; and
   (g) discharging iron oxide-containing material from the bottom of the first fluidized bed reactor and withdrawing an exhaust gas containing a zinc-containing material from the first cyclone and feeding said exhaust gas to a gas-solids separator.

2. The method defined in claim 1 wherein prior to step (a) water content of the iron oxide-containing dust or sludge is adjusted to less than 13% by weight.

3. The method defined in claim 1, step (a) wherein the granules formed have a particle size from 0.1 to 3.0 mm.

4. The method defined in claim 1 wherein prior to step (b) the granules are dried to have a water content of less than 10% by weight before they are fed to the first fluidized bed reactor.

5. The method defined in claim 1 wherein the temperature in the first fluidized bed reactor is adjusted to 1000° to 1050° C.

6. The method defined in claim 1 wherein 20 to 30% by weight of the material fed into the first fluidized bed reactor is carbonaceous material.

7. The method defined in claim 1 wherein the ratio of carbon monoxide to carbon dioxide in the first fluidized bed reactor is adjusted to 1.1 to 1.5.

8. The method defined in claim 7 wherein the ratio of carbon monoxide to carbon dioxide in the first fluidized bed reactor is adjusted to 1.2 to 1.4.

9. The method defined in claim 1 wherein the weight of the solids fed per hour from the first cyclone to the second fluidized bed reactor is at least three times the weight of the solids contained in the first fluidized bed reactor.

10. The method defined in claim 1 wherein 70 to 80% by weight of the total carbonaceous material fed to the first and second fluidized bed reactor is fed to the second fluidized bed reactor.

11. The method defined in claim 1 wherein the iron oxide-containing material discharged from the first fluidized bed reactor is cooled in a first cooler to a temperature below 150° C. and water is added to the cooled material.

12. The method defined in claim 1 wherein from the gas-solids separator solids are withdrawn and are fed into the first cooler.

13. The method defined in claim 1 wherein from the gas-solids separator zinc-containing exhaust gas is withdrawn and is cooled in a second cooler, zinc-containing particles are formed in said second cooler, and zinc-containing particles are separated from the exhaust gas withdrawn from said second cooler.

* * * * *